US008943566B2

(12) United States Patent
DeLuca et al.

(10) Patent No.: US 8,943,566 B2
(45) Date of Patent: Jan. 27, 2015

(54) INCREASED SECURITY FOR COMPUTER USERID INPUT FIELDS

(75) Inventors: Lisa Seacat DeLuca, San Francisco, CA (US); Troy M. Volin, Chapel Hill, NC (US)

(73) Assignee: International Business Machines Corporation, Armonk, NY (US)

( * ) Notice: Subject to any disclaimer, the term of this patent is extended or adjusted under 35 U.S.C. 154(b) by 652 days.

(21) Appl. No.: 13/247,375

(22) Filed: Sep. 28, 2011

(65) Prior Publication Data
US 2013/0081120 A1 Mar. 28, 2013

(51) Int. Cl.
*G06F 7/04* (2006.01)
*G06F 17/27* (2006.01)
*H04L 29/06* (2006.01)
*H04L 29/08* (2006.01)
*H04W 4/04* (2009.01)
*H04W 12/06* (2009.01)
*G06F 21/31* (2013.01)
*G06F 17/30* (2006.01)

(52) U.S. Cl.
CPC ............ *G06F 17/276* (2013.01); *H04L 63/107* (2013.01); *H04L 29/08* (2013.01); *H04W 4/04* (2013.01); *H04W 12/06* (2013.01); *G06F 21/31* (2013.01); *H04L 63/083* (2013.01); *G06F 17/30899* (2013.01); *G06F 2221/2111* (2013.01)
USPC .......................................................... 726/7

(58) Field of Classification Search
CPC ........................... H04L 63/107; G06F 17/276
USPC .......................................................... 726/7
See application file for complete search history.

(56) References Cited

U.S. PATENT DOCUMENTS

| 6,208,339 | B1 | 3/2001 | Atlas et al. |
| 6,377,965 | B1 * | 4/2002 | Hachamovitch et al. ...... 715/203 |
| 7,489,659 | B2 * | 2/2009 | Siorpaes et al. .............. 370/331 |
| 7,705,829 | B1 | 4/2010 | Plotnikov |
| 7,770,124 | B2 | 8/2010 | Argo et al. |

(Continued)

FOREIGN PATENT DOCUMENTS

JP 2009087214 A 4/2009

OTHER PUBLICATIONS

Adielsson et al. "Getting Started with OpenOffice.org." Chapter 4—Getting Started with Writer, cover pages and pp. 103-104. (OpenOffice.org3.) Published Feb. 2, 2010. Copyright © 2005-2010. <http://wiki.services.openoffice.org/w/images/e/e1/0100GS3-GettingStartedOOo3.pdf>.

(Continued)

*Primary Examiner* — Michael Chao
(74) *Attorney, Agent, or Firm* — David Zwick; Matthew Chung (57) ABSTRACT

A computer determines whether current location information of the computer indicates that the computer is at a home location. The computer determines a minimum number of characters to be entered by a user into a userID field to cause the computer to automatically display previously entered userIDs based on whether the computer is located at a home location. If fewer than the minimum characters are entered, previously entered userIDs are not displayed. Location information can be based on one or more of: wi-fi signal strengths, cell tower signal strengths and signal arrival timing information, whether the network connection is wireless or Ethernet cable, the wireless protocol, whether a wi-fi connection is secured or public, whether the computer is a mobile device, and satellite navigation system location.

18 Claims, 5 Drawing Sheets

(56) References Cited

U.S. PATENT DOCUMENTS

| | | | |
|---|---|---|---|
| 7,774,003 | B1 | 8/2010 | Ortega et al. |
| 8,095,112 | B2 * | 1/2012 | Chow et al. ............ 455/410 |
| 2004/0080529 | A1 | 4/2004 | Wojcik |
| 2004/0225880 | A1 | 11/2004 | Mizrah |
| 2005/0164675 | A1 | 7/2005 | Tuulos et al. |
| 2010/0048167 | A1 | 2/2010 | Chow et al. |

OTHER PUBLICATIONS

Breebaart. "BreeBoard: OpenOffice tricks: autocomplete." Published Nov. 7, 2006. <http://breeboard.blogspot.com/2006/11/openoffice-tricks-autocomplete.html>.

Buecker et al. "Cloud Security Guidance IBM Recommendations for the Implementation of Cloud Security." IBM® Redpapers™. © Copyright IBM Corporation 2009. Last updated Nov. 2, 2009.

Granneman. "AutoCorrect and AutoFormat Settings in OpenOffice.org." Last accessed: Jun. 9, 2011, <http://www.granneman.com/techinfo/tools/openofficeorg/autocorrectandautoformat.htm>.

Mozilla. "Form autocomplete | How to | Firefox Help." Last accessed: Sep. 28, 2011, <http://support.mozilla.com/en-US/kb/Form autocomplete>.

Pam-Face-Authentication. "A Pluggable Authentication Module for Face Authentication—Google Project Hosting." © 2011 Google. Last accessed: Jun. 9, 2011, <http://code.google.com/p/pam-face-authentication/>.

Shahriar et al. "Client-Side Detection of Cross-Site Request Forgery Attacks." 2010 IEEE 21st International Symposium on Software Reliability Engineering (ISSRE), pp. 358-367, Nov. 1-4, 2010.

* cited by examiner

INCREASED SECURITY FOR COMPUTER USERID INPUT FIELDS

FIELD OF THE INVENTION

The present invention relates generally to computer security, and more particularly to autofill of a userID field.

BACKGROUND

Many applications that are accessed from a user computing device require a valid userID for access. For example, accessing bank account or other account information over the Internet via a web browser will require entry of a valid userID and password. Entry of a valid userID and password is typically accomplished by having a form embedded on a web page that will cause the browser to display userID and password input form fields. The user enters userID and password characters into the appropriate input form field and the web browser causes the computing device to transmit the information to a network server. Application programs residing entirely on the user's computing device—for example a licensed computer aided design (CAD) program—can also require entry of a valid userID and password. When the CAD program is initiated, a screen displays userID and password input fields and requires entry of a valid userID and password to continue.

Many programs that display forms include an "autofill" function that will store inputs to a form field. This is a common feature of web browsers. When a user encounters the same form field again and begins to enter characters into the field, the web browser will display some or all of the previous entries for this field, typically in a drop-down menu, and allow the user to select one of the displayed entries to populate the field.

The autofill functionality typically narrows down the list of displayed previous user entries to those that begin with the characters the user has entered so far into the field. As an example, a user may use several email accounts to receive information from different websites. When the web browser is displaying a web page received from a website that is requesting an email address, the user mouse-clicks in the email address form field and the web browser displays all email addresses that have been entered in any email address form field at any website with that browser. As the user begins entering an email address, the list of displayed previously entered email addresses is first narrowed to those email addresses that begin with the first character the user has entered, then is narrowed to email addresses that begin with the first two characters entered, and so on. If the user is entering an email address that has not been used before in an email address form field, then at some point there will not be a match to any previously entered email addresses. When this occurs, no matching previously entered email addresses will be displayed and the browser will typically store the new email address entry. At any time, the user may select one of the displayed previously entered email addresses to populate the field, or select the "enter" key to populate the field with the characters entered so far.

Most web browsers recognize "sensitive" form fields and will provide a greater level of security with regard to saving entered information. For example, most web browsers recognize the userID and password form fields as sensitive and will give the user the option of storing information entered into these fields on a per website basis.

Most web browsers allow the user to specify a browser preference to not save any entered forms information. Also, a website author can specify on the web page whether to allow the saving of entered information and displaying of previously entered form field information for an entire form or for specific form fields.

Popular web browsers that include some or all of the autofill functionality described above include Firefox™ web browser (a trademark of Mozilla.org), Internet Explorer™ web browser (a trademark of Microsoft Corp.), Chrome™ web browser (a trademark of Google, Inc.), and Safari™ web browser (a trademark of Apple, Inc.).

It is also known to automatically determine the location of a computing device. This capability is used by various smart phone applications to determine the location of the phone so as to provide certain relevant information. For example, Google Maps uses geolocation information to display a smart phone's location on a map and to provide travel directions or indicate nearby businesses. In practice, generally, a smart phone application will request the phone to provide environmental information such as in-range wireless access point (wi-fi) signal strengths, in-range cell tower signal strengths, in-range cell tower signal arrival timing information, and GPS coordinates. This information is transmitted by the application to a geolocation service provider, such as Google Location Services, and the geolocation service provider returns a geographic location to the requesting program. If the quality and quantity of information sent to the geolocation service provider is high, the smart phone's location can be determined by the service provider to within a few meters.

The location of a computing device can also be determined from the device Internet Protocol (IP) address. Similar to the geolocation method described above, the device IP address is transmitted to an IP geolocation service provider, which returns a physical address. However, physical location based on IP address may not always be accurate. For example, many home internet service providers assign IP addresses dynamically to devices requesting access using Dynamic Host Protocol Configuration (DHCP). A device may keep the same assigned IP address for an extended period of time, but the assignment is not permanent and the device may not have the same IP address session to session. In these situations, the geolocation service provider may return the address of an internet service provider data center near the home user rather than the home user's physical location.

SUMMARY

Embodiments of the present invention provide a system, method, and program product to increase security for entry of a userID into a userID field displayed on a screen of a computer. The computer determines whether information indicating a current location of the computer indicates that the computer is currently located at a home location of the computer. The computer determines a minimum number of characters to be entered by a user into the userID field to cause the computer to automatically display on the screen userIDs entered previously into the userID field, with the minimum number characters to be entered based on whether the current location information of the computer indicates that the computer is currently located at the home location. Responsive to each character entered by the user into the userID field, the computer determines if the minimum number of characters has been entered by the user into the userID field. If so, the computer displays on the screen userIDs entered previously into the userID field that begin with the characters entered into the userID field, and, if not, the computer does not display userIDs entered previously into the userID field.

According to certain embodiments of the invention, current location information is based in part on one or more of:

in-range wireless access point signal strengths, in-range cell tower signal strengths, in-range cell tower signal arrival timing information, whether the network connection is via a wireless adapter or an Ethernet cable connection; the wireless protocol, whether a wi-fi connection is secured by a password, whether the user device is a mobile device, and satellite navigation system location.

DETAILED DESCRIPTION

In brief summary, one preferred embodiment of the invention is practiced in the context of a user accessing a restricted application via a computer's web browser, where the restricted application requires entry of a userID for access. A web page is displayed that includes a userID input field. As characters are entered into the userID field, the web browser's autofill feature will show previously entered userIDs for the restricted application, typically in an adjacent drop-down menu, but only after a minimum number of characters are entered. The minimum character count is dynamically determined based on whether the computer is physically located at its "home location." If the computer is not at its home location, the minimum character count will be greater than if the computer is at its home location. Home location is determined from environmental and other factors, including in-range wireless access points and cell towers, satellite navigation system (for example, GPS) coordinates, IP address, network connection type, and make/model of the computer (indicative of whether the computer is mobile). Access security for computers which are not currently at their home location is increased because a user must know the first several characters of a userID that has been used before on the computer by the rightful owner, before the autofill feature will display the drop-down menu with the previously used, complete userIDs.

Figure 1:
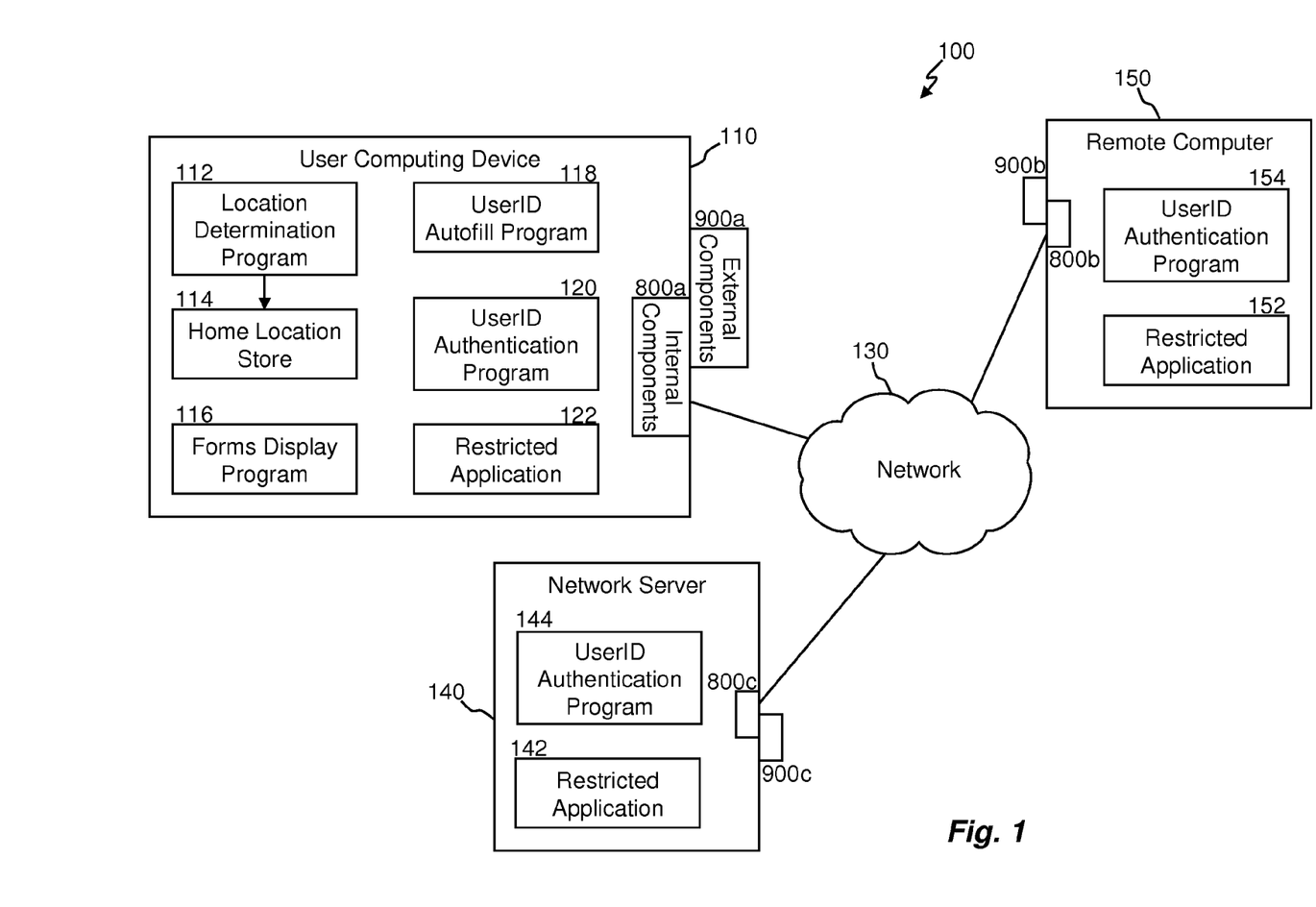
FIG. 1 is a block diagram of a distributed data processing environment in accordance with an embodiment of the present invention.

FIG. 1 is a functional block diagram illustrating a distributed computer system 100 in accordance with one embodiment of the present invention. System 100 includes user computing device 110, network server 140, and remote computer 150, all interconnected over network 130. Network 130 can be, for example, a local area network (LAN), a wide area network (WAN) such as the Internet, or a combination of the two, and include wired, wireless, or fiber optic connections. In general, network 130 can be any combination of connections and protocols that will support communications between user computing device 110, network server 140, and remote computer 150 in accordance with a desired embodiment of the invention.

In preferred embodiments of the present invention, user computing device 110 can be a laptop, tablet, or netbook personal computer (PC), a desktop computer, a personal digital assistant (PDA) such as a Blackberry™, or a smart phone. In general, user computing device 110 can be any programmable electronic device as described in further detail with respect to FIG. 5. User computing device 110 includes location determination program 112 and associated home location store 114, forms display program 116, userID autofill program 118, userID authentication program 120, and restricted application 122. User computing device 110 also includes internal hardware components 800a and external hardware components 900a.

Location determination program 112 operates to determine current location information for user computing device 110, and if user computing device 110 is at its "home location." A computing device's home location is defined as the actual or approximate physical location at which the computing device usually resides, as determined by environmental information and other device characteristics that are present when the computing device is at its usual residence.

In a preferred embodiment, location determination program 112 gathers environmental information from user computing device sensors and interfaces 800a such as: in-range wireless access point (wi-fi) signal strengths, in-range cell tower signal strengths and in-range cell tower signal arrival timing information, which can determine physical location based on such techniques as cell of origin, highest signal strength, time difference of arrival, triangulation, etc.; and satellite navigation system information from, for example, a GPS receiver chipset which can determine geographic longitude and latitude. Other satellite navigation systems that may be used include the Galileo positioning system in use in Europe, the GLONASS positioning system in use in Russia, and the Compass navigation system in use in China.

Location determination program 112 gathers additional device and connection information from user computing device 110, including network IP address, whether the network connection is via a wireless adapter or an Ethernet cable connection, the wireless protocol (e.g., 802.11, 3G, 4G, etc.), whether a wi-fi connection is secured by a password or is "public," and the make and model of the user device 110 motherboard, which is typically stored in a read-only memory on the motherboard and can indicate whether the device is mobile or conversely, stationary such as a desk top computer. This device and connection information generally isn't used to determine physical location of user computing device 110 directly (although, as discussed above, IP address might be able to be used for this purpose. Rather, this information is used to determine whether or not user computing device 110 is at its home location. For example, a current location IP address that is different than the stored home location IP address can indicate that user computing device 110 is accessing the network from an access point that is geographically different from the computing device's home location. Similarly, different current and home location physical network connection types (wireless vs. wired), different wireless protocols, secure vs. public networks, and different motherboard information all may indicate that the computing device is not at its home location. This location information collectively forms a current location profile for user computing device 110 and indicates the current geographical location of user device 110. The current location profile is then compared against the user device 110 home location profile, which is collected in the same manner as a current location profile while user device 110 is at its home location and stored in home location store 114.

If there is a sufficient match between the current location profile and the home location profile stored in home location store 114, then location determination program 112 will indicate a match and return an appropriate value to the calling program. What constitutes a sufficient match can be determined in a variety of ways and is an implementation decision. For example, longitude and latitude coordinates determined from a satellite navigation system are considered to be very reliable, and can determine the geographical location of a satellite navigation system enabled device to within a few meters. Thus, one method for determining whether there is a sufficient match is to rely solely on satellite navigation system coordinates if this information is available for both current and home location profiles. If, for example, the home location is represented by a satellite navigation system location of the user device 110 when at the user's residence or office, the home location could be a predetermined radius (for example, corresponding to the perimeter of the residence building or office room) from that satellite navigation system location. If the current location as determined by satellite navigation system information in the current location profile indicates that user device 110 is within the predetermined radius, then there is a sufficient match.

However, in a related scenario, it is possible for an unauthorized user to access user device 110 within the predetermined radius, but not know the wireless passphrase that is required (in this scenario) for Internet access from the home location. So the unauthorized user accesses the Internet over an available public wi-fi connection. In this scenario, a more secure implementation of determining a sufficient match would include comparing the current and home location profiles for whether they both indicate wireless access through a secured wireless access point. A mismatch would indicate that access to the Internet is being attempted in a manner that is not "normal" as indicated by the home location profile, and the access may be unauthorized. Even though there may be a sufficient match on satellite navigation system coordinates, there is not a match on whether wireless access is through a secured wireless access point and a "no-match" would be returned by location determination program 112.

Thus, depending on the desired level of security, the types of user computing devices, the location of the users, etc., various algorithms to determine whether there is a sufficient match can utilize different location related environmental information and device information. Different weighting factors can also be given to the various pieces of information, ranging, for example, from zero to one.

In preferred embodiments, location determination program 112 returns a Boolean value indicating either a sufficient or not sufficient match between the current location profile and the stored home location profile, or a qualitative value, for example a fractional value between zero and one, indicating the "degree" of match between the current location profile and the stored home location profile. For example, if close matches are desired, only slight differences between the stored and current signal strengths will cause location determination program 112 to return a "no match" Boolean value or a "low" qualitative value.

Depending on the specific user computing device 110, different environmental and device information may be available to location determination program 112. For example, if user computing device 110 is a desktop-type PC, it may not have wireless capability and would not have access to in-range wi-fi and cell tower signal strengths and cell tower signal arrival timing information. In this case, the home location profile may consist entirely of device information.

In a preferred embodiment of the invention, home location store 114 is initially populated the first time location determination program 112 is installed and the user (after entry of a valid password) requests the user device to designate the current location as the home location. In response, the location determination program determines the current location information of the user device, and stores this information as the home location. Administrative access to the program to update the home location profile stored in home location store 114 is password protected, and the information in home location store 114 is encrypted. In other embodiments of the invention access security and encryption security levels can vary. In still other embodiments of the invention, multiple "home location" profiles may be stored in home location store 114 and a match on any stored profile will cause location determination program 112 to indicate that user computing device 110 is at its home location.

In a preferred embodiment, home location store 114 resides in user computing device 110. In other embodiments, home location store 114 can reside on a network server, such as network server 140, or on a remote computer, such as remote computer 150. In general, home location store 114 can reside anywhere within distributed computer system 100 provided it is accessible to location determination program 112.

In a preferred embodiment of the invention, location determination program 112 is an add-on to a web browser, for example, forms display program 116, which is called from within a web page. For example, the add-on can be called from within a web page forms block just before a userID input statement. In other embodiments, location determination program 112 can be, for example, a program or library module within a standalone user application, such as restricted application 122, which could be, for example, a licensed CAD application.

An alternative embodiment of the invention can be implemented on user computing devices that store a log of geographic tracking information on the user computing device. For example, many smart phones with GPS capability store a time log of the GPS location of the phone. In this alternative embodiment, home location can be determined dynamically by examining the GPS tracking log on the phone and determining the location or locations at which the smart phone spends the most amount of time. These locations can be considered to be home locations. To determine whether the smart phone is at a home location, the current GPS location is compared against the dynamically determined home locations. While this example refers to GPS tracking information, this method may be used on any user computing device that tracks and logs actual or approximate geographical location.

Forms display program 116 is a program with the capability of displaying on a display device at least a form having a userID input field. In addition, forms display program 116 can call or invoke location determination program 112 and userID autofill program 118. In a preferred embodiment of the present invention, forms display program 116 is a web browser, for example, one of Firefox™, Internet Explorer™, Chrome™, or Safari™ web browsers. These web browsers display web pages received over the Internet (130) from specific network addresses, referred to as uniform resource locators (URLs). Web pages are authored primarily in hypertext markup language (HTML), which supports the display of forms with input form fields. In addition, these web browsers include form field autofill functionality, and each supports a rich library of add-ons. In other embodiments, forms display program 116 can be, for example, a program or library module within a standalone user application, such as restricted applications 122, 142, and 152.

UserID autofill program 118 is a program that works with forms display program 116 to store input form field userID entries by URL in a database, and display these stored userID entries when a user entry is detected in a userID form field. UserID autofill program 118 performs an incremental search of the database and displays userID entries that match on the characters entered, typically in a drop-down menu adjacent the form input field, and allows the user to select a displayed userID entry to populate the userID form input field. UserID autofill program 118 stores userID input form field user entries by URL. UserID input form fields may be labeled, for example, as "userID", "username", "logon ID", etc.

UserID autofill program 118 displays matching previously entered userIDs only after a minimum number of characters have been entered into the userID form input field. The minimum character count is determined dynamically based on the value returned by location determination program 112. If the returned value indicates a "no-match" or poor match between current and stored location profiles, the minimum character count will be greater than if the returned value indicates a "match" or good match. The userID minimum character count can range, for example, from a default minimum character count of three when there is a "match," to a "security" minimum character count of seven when "no-match" is indicated.

In a preferred embodiment of the invention, forms display program 116 calls location determination program 112 when it finds a userID form input field on a web page. The default minimum character count and the "security" minimum character count are set as user preferences of forms display program 116 or userID autofill program 118. The minimum userID character count is determined based on these preferences and the value returned by location determination program 112. When userID information is entered into the userID form input field, userID autofill program 118 will display previously entered userID entries after the minimum userID characters have been entered. This process is explained in more detail with respect to FIG. 2.

UserID authentication programs 120, 144, 154 operate in a traditional manner to validate the userIDs and passwords that are entered to gain access to restricted applications 122, 142, 152, respectively. The UserID authentication programs 120, 144, 154, and restricted applications 122, 142, 152, respectively, typically are closely linked and reside on the same platforms. In general restricted application 122, 142, 152 can be any application that requires entry of a valid userID and password for access. A typical restricted application would be a network server application 142 residing on a network server 140 that allows access to user account information, for example bank account information, via a web browser 116 over the Internet 130. Another example of a restricted application is a CAD system that is licensed to certain userIDs. The CAD system could reside on user computing device 110, as indicated by restricted application 122 and user authentication program 120; or on remote computer 150, as indicated by user authentication program 154 and restricted application 152. In general, network server 140 and remote computer 150 can be any programmable electronic device as described in further detail with respect to FIG. 5.

Figure 2:
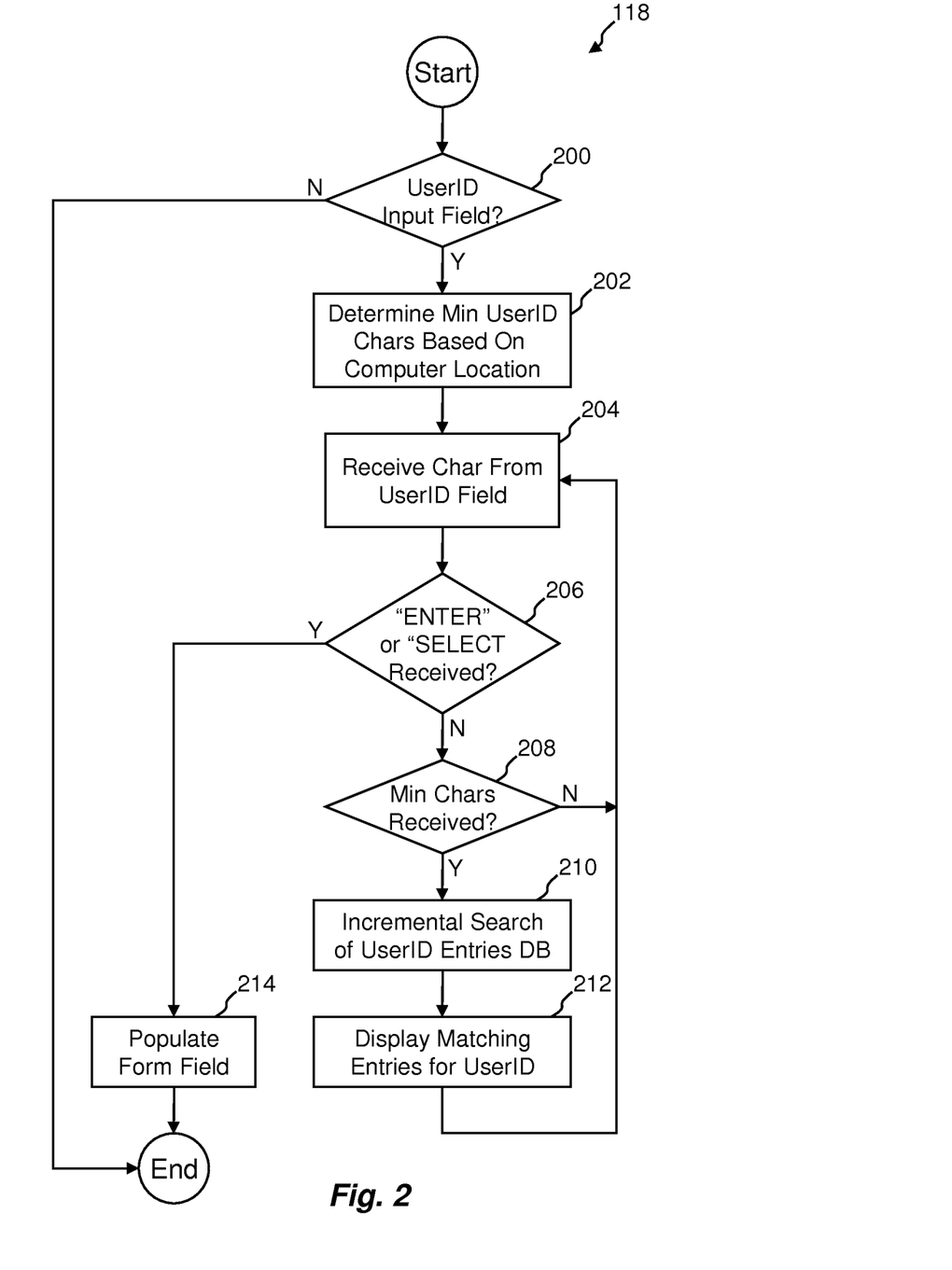
FIG. 2 is a flowchart illustrating the steps of a userID autofill program of FIG. 1 in accordance with an embodiment of the present invention.

FIG. 2 is a flowchart illustrating the steps of userID autofill program 118 in accordance with an embodiment of the present invention. Forms display program 116 receives a form to display from restricted application 122, 142, or 152. When the mouse or pointing device of user computing device 110 is clicked in a userID form input field of the form, forms display program 116 calls userID autofill program 118.

UserID autofill program 118 determines if the forms input field is a userID input field (step 200). For example, in HTML, input fields are designated with an "input" tag, which includes a field name and the text to display. If either of these indicates that the input field is not a userID input field (decision 200, no branch), processing for userID autofill program 118 ends and default autofill processing for non-userID input field is done.

If it is determined that the forms input field is a userID input field, such as "user name", "userID", "login", etc. (decision 200, yes branch), a minimum input character count is determined (step 202). The userID autofill program 118 calls the location determination program 112 to determine if the current location profile of user computing device 110 sufficiently matches its home location profile. If there is a sufficient match, indicating user computing device 110 is at its home location, then userID autofill program 118 sets the minimum userID input character count to the default minimum character count. If location determination program 112 returns a "no-match" value, userID autofill program 118 sets the minimum userID input character count to the "security" minimum character count.

Next, forms display program 116 receives characters entered by the user into the userID input field (step 204). If the received character is an "Enter" key (decision 206, yes branch), the characters received so far are treated as the full field entry (step 214) and forms display program 116 transmits the entered characters to userID authentication program 122, 144, or 154. UserID autofill program 118 then ends processing. Similarly, if the received character is a "select" of one of the displayed previously entered userIDs (decision 206, yes branch), then forms display program 116 transmits the selected previous entry to userID authentication program 122, 144, or 154, and userID autofill program 118 ends processing.

If the received character is other than an "Enter" or "select," (decision 206, no branch) then userID autofill program 118 determines (step 208) whether the minimum number of characters has been received. If the minimum number of characters has not been received (decision 208, no branch), then userID autofill program 118 waits for an additional character to be entered (step 204). If the minimum number of characters has been received (decision 208, yes branch), then userID autofill program 118 conducts an incremental search of the previously entered userIDs (step 210) and userID autofill program 118 instructs the user device to display the previously entered userIDs that match on the characters received (step 212). Forms display program 116 then waits for an additional character to be entered (204).

Figure 3:
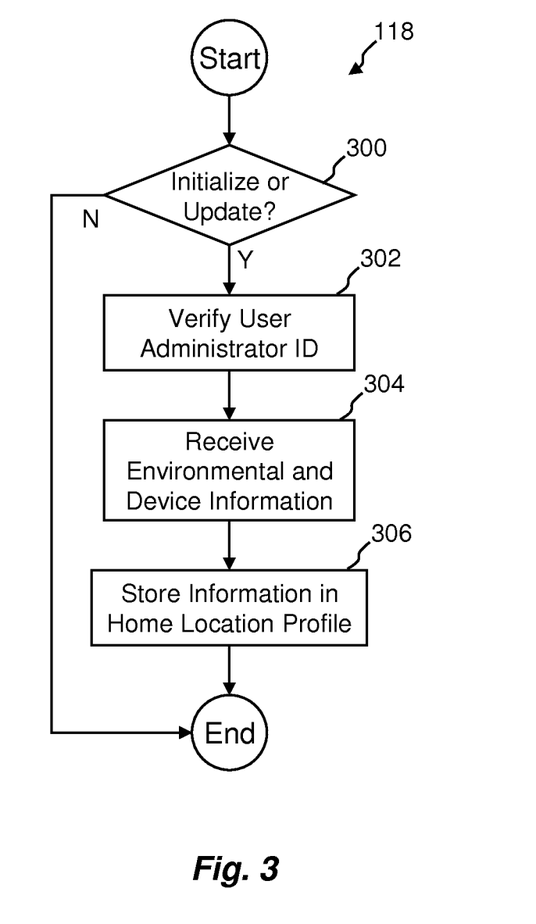
FIG. 3 is a flowchart illustrating the steps that a location determination program follows when initializing or updating the home location profile in accordance with an embodiment of the present invention.

FIG. 3 is a flowchart illustrating the steps that location determination program 112 follows when initializing or updating the home location profile stored in home location store 114, in accordance with an embodiment of the present invention. When location determination program 112 is first installed or when a user desires to update the home location profile for user computing device 110 (decision 300, yes branch), location determination program 112 requests the user to enter a valid administrator id and password (step 302). Location determination program 112 then collects environmental and device information from user computing device 110 sensors and interfaces 800*a* (step 304) and stores this information in home location store 114 (step 306).

Figure 4:
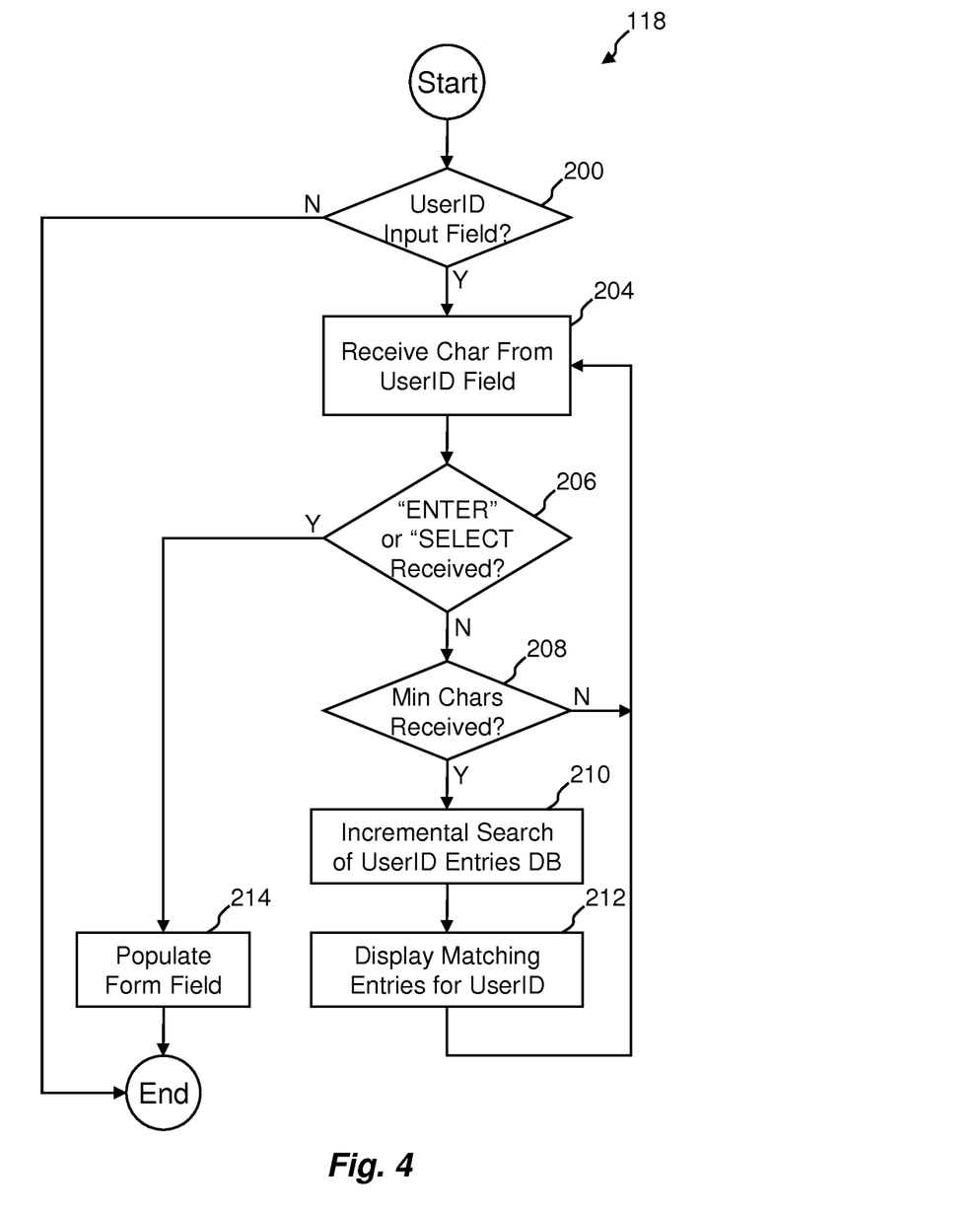
FIG. 4 is a flowchart illustrating the steps of a userID autofill program of FIG. 1 in accordance with an alternative embodiment of the present invention.

FIG. 4 is a flowchart illustrating an alternative embodiment of the steps of userID autofill program 118. In this embodiment, location determination program 112, associated home location store 114, and the "security" minimum character count user preference are absent from the embodiment. If a userID input field is present on a web page (step 200), userID autofill program 118 will display previously received userID entries (step 212) after a default minimum number of characters have been received (decision 208, yes branch). As in the embodiment described with respect to FIG. 2, the default minimum number of characters can be, for example, a user preference for forms display program 116 or userID autofill program 118. The steps illustrated in FIG. 3 perform the same functions as the correspondingly numbers steps of FIG. 2 described above.

Figure 5:
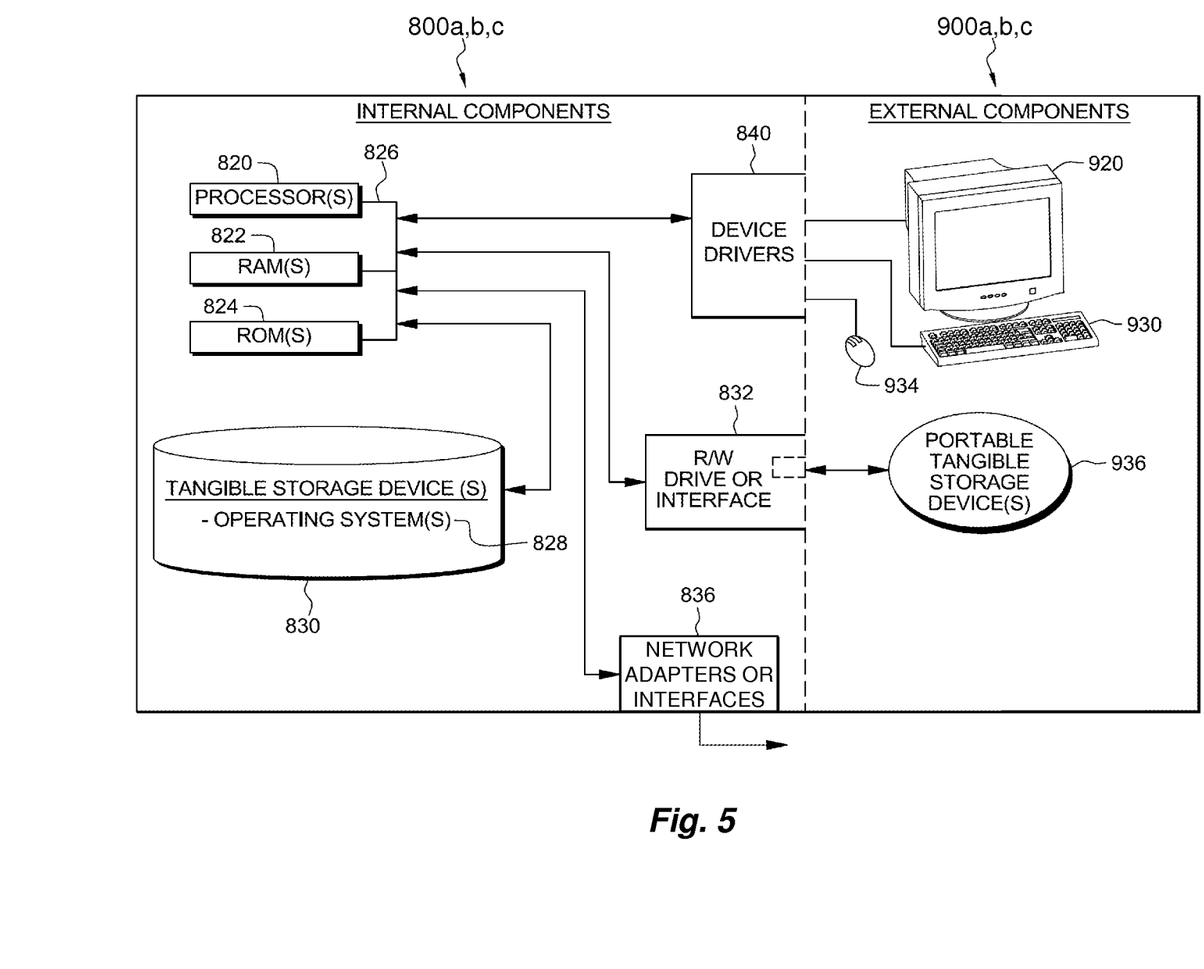
FIG. 5 is a block diagram of hardware and software within the computers of FIG. 1 in accordance with an embodiment of the present invention.

FIG. 5 shows a block diagram of the components of a data processing system 800, 900, such as user computing device 110, network server 140, or remote computer 150, in accordance with an illustrative embodiment of the present invention. It should be appreciated that FIG. 5 provides only an illustration of one implementation and does not imply any limitations with regard to the environments in which different embodiments may be implemented. Many modifications to the depicted environments may be made based on design and implementation requirements.

Data processing system 800, 900 is representative of any electronic device capable of executing machine-readable program instructions. Data processing system 800, 900 may be representative of a smart phone, a computer system, PDA, or other electronic devices. Examples of computing systems, environments, and/or configurations that may represented by data processing system 800, 900 include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

User computing device 110, remote computer 150, or network server 140 include respective sets of internal components 800a, b, c and external components 900a, b, c illustrated in FIG. 5. Each of the sets of internal components 800a, b, c includes one or more processors 820, one or more computer-readable RAMs 822 and one or more computer-readable ROMs 824 on one or more buses 826, and one or more operating systems 828 and one or more computer-readable tangible storage devices 830. The one or more operating systems 828 and programs 112, 116, 118, 120 and 122 in user computing device 110; programs 142 and 144 in network server 140; and programs 152 and 154 in remote computer 150 are stored on one or more of the respective computer-readable tangible storage devices 830 for execution by one or more of the respective processors 820 via one or more of the respective RAMs 822 (which typically include cache memory). In the embodiment illustrated in FIG. 5, each of the computer-readable tangible storage devices 830 is a magnetic disk storage device of an internal hard drive. Alternatively, each of the computer-readable tangible storage devices 830 is a semiconductor storage device such as ROM 824, EPROM, flash memory or any other computer-readable tangible storage device that can store a computer program and digital information.

Each set of internal components 800a, b, c also includes a R/W drive or interface 832 to read from and write to one or more portable computer-readable tangible storage devices 936 such as a CD-ROM, DVD, memory stick, magnetic tape, magnetic disk, optical disk or semiconductor storage device. The programs 112, 116, 118, 120 and 122 in user computing device 110; programs 142 and 144 in network server 140; and programs 152 and 154 in remote computer 150 can be stored on one or more of the respective portable computer-readable tangible storage devices 936, read via the respective R/W drive or interface 832 and loaded into the respective hard drive 830.

Each set of internal components 800a, b, c also includes network adapters or interfaces 836 such as a TCP/IP adapter cards, wireless wi-fi interface cards, or 3G or 4G wireless interface cards or other wired or wireless communication links. The programs 112, 116, 118, 120 and 122 in user computing device 110; programs 142 and 144 in network server 140; and programs 152 and 154 in remote computer 150 can be downloaded to respective computers 110, 140, and 150 from an external computer via a network (for example, the Internet, a local area network or other, wide area network) and respective network adapters or interfaces 836. From the network adapters or interfaces 836, the programs 112, 116, 118, 120 and 122 in user computing device 110; programs 142 and 144 in network server 140; and programs 152 and 154 in remote computer 150 are loaded into the respective hard drive 830. The network may comprise copper wires, optical fibers, wireless transmission, routers, firewalls, switches, gateway computers and/or edge servers.

Each of the sets of external components 900a, b, c can include a computer display monitor 920, a keyboard 930, and a computer mouse 934. External components 900a, b, c can also include touch screens, virtual keyboards, touch pads, pointing devices, and other human interface devices. Each of the sets of internal components 800a, b, c also includes device drivers 840 to interface to computer display monitor 920, keyboard 930 and computer mouse 934. The device drivers 840, R/W drive or interface 832 and network adapter or interface 836 comprise hardware and software (stored in storage device 830 and/or ROM 824).

Aspects of the present invention have been described with respect to block diagrams and/or flowchart illustrations of methods, apparatus (system), and computer program products according to embodiments of the invention. It will be understood that each block of the flowchart illustrations and/or block diagrams, and combinations of blocks in the flowchart illustrations and/or block diagrams, can be implemented by computer instructions. These computer instructions may be provided to a processor of a general purpose computer, special purpose computer, or other programmable data processing apparatus to produce a machine, such that instructions, which execute via the processor of the computer or other programmable data processing apparatus, create means for implementing the functions/acts specified in the flowchart and/or block diagram block or blocks.

The aforementioned programs can be written in any combination of one or more programming languages, including low-level, high-level, object-oriented or non object-oriented languages, such as Java, Smalltalk, C, and C++. The program code may execute entirely on the user's computer, partly on the user's computer, as a stand-alone software package, partly on the user's computer and partly on a remote computer, or entirely on a remote computer or server. In the latter scenario, the remote computer may be connected to the user's computer through any type of network, including a local area network (LAN) or a wide area network (WAN), or the connection may be made to an external computer (for example, through the Internet using an Internet service provider). Alternatively, the functions of the aforementioned programs can be implemented in whole or in part by computer circuits and other hardware (not shown).

Based on the foregoing, computer system, method and program product have been disclosed in accordance with the present invention. However, numerous modifications and substitutions can be made without deviating from the scope of the present invention. Therefore, the present invention has been disclosed by way of example and not limitation.

What is claimed is:

1. A method to increase security for entry of a userID into a userID field displayed on a screen of a computer, the method comprising the steps of:
- the computer determining whether information indicating a current location of the computer indicates that the computer is currently located at a home location of the computer;
- the computer determining a minimum number of characters to be entered by a user into the userID field to cause the computer to automatically display on the screen userIDs entered previously into the userID field, the minimum number based on whether the current location information of the computer indicates that the computer is currently located at the home location, and the minimum number being greater if the computer is not currently located at the home location than if the computer is currently located at the home location;
- responsive to each character entered by the user into the userID field, the computer determining if the minimum number of characters has been entered by the user into the userID field, and
- if so, the computer displaying on the screen userIDs entered previously into the userID field that begin with the characters entered into the userID field, and
- if not, the computer not displaying userIDs entered previously into the userID field.

2. The method of claim 1, further comprising the step of the computer determining the home location of the computer.

3. The method of claim 2, wherein the step of the computer determining the home location of the computer further comprises the steps of:
- receiving an indication from a user of the computer that a current location of the computer is the home location of the computer; and
- determining the current location information of the computer in response to the indication from the user.

4. The method of claim 3 wherein the step of the computer determining whether the current location information of the computer indicates that the computer is at a home location of the computer further comprises:
- determining if there is a sufficient match between the current location information of the computer and the location information determined while the computer is at the home location of the computer.

5. The method of claim 1, wherein current location information is based in part on one or more of: in-range wireless access point signal strengths, in-range cell tower signal strengths, in-range cell tower signal arrival timing information, whether the network connection is via a wireless adapter or an Ethernet cable connection, the wireless protocol, whether a wi-fi connection is secured by a password, whether the computer is a mobile device.

6. The method of claim 1 wherein current location information is based on a satellite navigation system location of the computer.

7. The method of claim 1, wherein the step of determining if the minimum number of characters has been entered further comprises:
- in response to the computer determining that the minimum number of characters has been entered into the userID field:
  - the computer accessing a database of userIDs previously entered into the userID field;
  - the computer performing an incremental search of the database to identify stored userIDs that match on the characters entered into the userID field; and
  - the computer displaying on the screen matching stored userIDs.

8. The method of claim 1, wherein determining a minimum number of characters to be entered is further based on the program that is requiring entry of the userID for user access.

9. A computer system to increase security for entry of a userID into a userID field displayed on a screen of a computer, the computer system comprising:
- one or more processors, one or more computer-readable memories, one or more computer-readable tangible storage devices, and program instructions stored on at least one of the one or more storage devices for execution by at least one of the one or more processors via at least one of the one or more memories, the program instructions comprising:
- program instructions to determine whether information indicating a current location of the computer indicates that the computer is currently located at a home location of the computer;
- program instructions to determine a minimum number of characters to be entered by a user into the userID field to cause the computer to automatically display on the screen userIDs entered previously into the userID field, the minimum number based on whether the current location information of the computer indicates that the computer is currently located at the home location, and the minimum number being greater if the computer is not currently located at the home location than if the computer is currently located at the home location;
- program instructions, responsive to each character entered by the user into the userID field, to determine if the minimum number of characters has been entered by the user into the userID field, and
- if so, program instructions to display on the screen userIDs entered previously into the userID field that begin with the characters entered into the userID field, and
- if not, further program instructions to not display userIDs entered previously into the userID field.

10. The computer system of claim 9, wherein the program instructions to determine a minimum number of characters to be entered further include program instructions to base the minimum number on the program that is requiring entry of the userID for user access.

11. A computer program product to increase security for entry of a userID into a userID field displayed on a screen of a computer, the computer program product comprising:
- one or more computer-readable storage devices and program instructions stored on at least one of the one or more tangible storage devices, the program instructions comprising:
- program instructions to determine whether information indicating a current location of the computer indicates that the computer is currently located at a home location of the computer;
- program instructions to determine a minimum number of characters to be entered by a user into the userID field to cause the computer to automatically display on the screen userIDs entered previously into the userID field, the minimum number based on whether the current location information of the computer indicates that the computer is currently located at the home location, and the minimum number being greater if the computer is not currently located at the home location than if the computer is currently located at the home location;

program instructions, responsive to each character entered by the user into the userID field, to determine if the minimum number of characters has been entered by the user into the userID field, and if so, program instructions to display on the screen userIDs entered previously into the userID field that begin with the characters entered into the userID field, and if not, further program instructions to not display userIDs entered previously into the userID field.

12. The computer program product of claim 11, further comprising program instructions, stored on at least one of the one or more tangible storage devices, to determine the home location of the computer.

13. The computer program product of claim 12, wherein the program instructions to determine the home location of the computer further comprise:

program instructions for receiving an indication from a user of the computer that a current location of the computer is the home location of the computer; and program instructions to determine the current location information of the computer in response to the indication from the user.

14. The computer program product of claim 13 wherein the program instructions to determine whether the current location information of the computer indicates that the computer is at a home location of the computer further comprises:

program instructions to determine if there is a sufficient match between the current location information of the computer and the location information determined while the computer is at the home location of the computer.

15. The computer program product of claim 11, wherein current location information is based in part on one or more of: in-range wireless access point signal strengths, in-range cell tower signal strengths, in-range cell tower signal arrival timing information, whether the network connection is via a wireless adapter or an Ethernet cable connection, the wireless protocol, whether a wi-fi connection is secured by a password, whether the computer is a mobile device.

16. The computer program product of claim 11 wherein current location information is based on a satellite navigation system location of the computer.

17. The computer program product of claim 11, wherein the program instructions to determine if the minimum number of characters has been entered further comprises:

program instructions, in response to determining that the minimum number of characters has been entered into the userID field, to:

access a database of userIDs previously entered into the userID field;

perform an incremental search of the database to identify stored userIDs that match on the characters entered into the userID field; and display on the screen matching stored userIDs.

18. The computer system of claim 11, wherein the program instructions to determine a minimum number of characters to be entered further include program instructions to base the minimum number on the program that is requiring entry of the userID for user access.

* * * * *